US011528893B2

(12) United States Patent
Morishima et al.

(10) Patent No.: US 11,528,893 B2
(45) Date of Patent: Dec. 20, 2022

(54) CEPHALOPOD REARING CAGE, CEPHALOPOD ESCAPE PREVENTION SHEET, AND USE THEREOF

(71) Applicant: Nippon Suisan Kaisha, Ltd., Tokyo (JP)

(72) Inventors: Kagayaki Morishima, Saiki (JP); Mai Tada, Saiki (JP); Yoshiro Hirata, Saiki (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 0 days.

(21) Appl. No.: 16/994,198

(22) Filed: Aug. 14, 2020

(65) Prior Publication Data

US 2020/0375154 A1 Dec. 3, 2020

Related U.S. Application Data

(63) Continuation-in-part of application No. PCT/JP2019/005180, filed on Feb. 14, 2019.

(30) Foreign Application Priority Data

Feb. 14, 2018 (JP) .............................. JP2018-024387

(51) Int. Cl.
*A01K 61/50* (2017.01)
*A01K 63/02* (2006.01)
*A01M 29/08* (2011.01)

(52) U.S. Cl.
CPC .............. *A01K 61/50* (2017.01); *A01K 63/02* (2013.01); *A01M 29/08* (2013.01)

(58) Field of Classification Search
CPC ........ A01K 61/50; A01K 61/53; A01K 63/02; A01K 74/00; A01K 77/00; A01M 29/08
See application file for complete search history.

(56) References Cited

U.S. PATENT DOCUMENTS

2004/0016176 A1* 1/2004 Hadar .................. G02B 5/208
47/31

FOREIGN PATENT DOCUMENTS

| CN | 201160428 Y | 12/2008 | | |
|----|-------------|---------|---|---|
| CN | 103 598 123 A | 2/2014 | | |
| CN | 104 054 615 A | 9/2014 | | |
| CN | 107156072 A | * 9/2017 | ............ | A01K 74/00 |
| EP | 3 527 069 A1 | 8/2019 | | |
| JP | H10-262488 A | 10/1998 | | |
| JP | 2009-072156 A | 4/2009 | | |
| JP | 2017-006054 A | 1/2017 | | |

(Continued)

OTHER PUBLICATIONS

National Geographic, published May 10, 2011 (Year: 2011).*

(Continued)

*Primary Examiner* — Richard T Price, Jr.
(74) *Attorney, Agent, or Firm* — Banner Witcoff, Ltd.

(57) ABSTRACT

A cephalopod rearing cage capable of maintaining a cephalopod alive, wherein at least a portion of the cephalopod rearing cage is constituted by using a mesh sheet of not less than 4 mesh. Also provided is a cephalopod escape prevention sheet capable of maintaining a cephalopod alive, wherein at least a portion of the cephalopod escape prevention sheet is constituted by using a mesh sheet of not less than 4 mesh.

31 Claims, 2 Drawing Sheets

(56) References Cited

FOREIGN PATENT DOCUMENTS

| | | | |
|---|---|---|---|
| JP | 2018-110561 A | 7/2018 | |
| KR | 20150020651 A * | 2/2015 | ............. A01K 74/00 |

OTHER PUBLICATIONS

Supplemental European search report for European patent application No. 19754980.1, dated Mar. 5, 2021.
The International Bureau of WIPO, International Preliminary Report on Patentability for International Application No. PCT/JP2019/005180, dated Aug. 18, 2020.
Net for Caught Octopuses. (Jun. 11, 2015). https://ameblo.jp/nagashima39/entry-12037665197.html.
Akiyama, N. (Mar. 26, 2017). *The technology to encourage rearing of Octopus sinensis in artificial high density habitats and the present situation of the larval rearing technique.* 2017 First Lecture Meeting of the Japanese Society of Fisheries Science on Fishery Stock Enhancement, Collection of Summaries, pp. 7-8.
Notice of Second Office Action dated Mar. 16, 2022 in Chinese Patent Application No. 201980013496.7 (14 pages) with an English translation (14 pages).
First Office Action dated Oct. 25, 2021 in Chinese Patent Application No. 201980013496.7 (10 pages) with an English translation (10 pages).
Decision of Rejection dated Jul. 29, 2022, in Chinese Patent Application No. 201980013496.7 (13 pages) with an English translation (7 pages).
Notice of Reasons for Refusal dated Sep. 7, 2022, in Japanese Patent Application No. 2020-500532 (3 pages) with an English translation (3 pages).

* cited by examiner

CEPHALOPOD REARING CAGE, CEPHALOPOD ESCAPE PREVENTION SHEET, AND USE THEREOF

CROSS-REFERENCE TO RELATED APPLICATIONS

The present application is a continuation-in-part of International Application No. PCT/JP2019/005180, filed Feb. 14, 2019, which claims priority from, and the benefit of, Japanese Patent Application No. JP 2018-024387, filed Feb. 14, 2018; said applications incorporated herein by reference in their entirety.

TECHNICAL FIELD

The present disclosure relates to a cephalopod rearing cage and a cephalopod escape prevention sheet capable of maintaining a cephalopod alive, and use of the same.

BACKGROUND ART

Aquaculture technology for various aquatic organisms are being actively developed for a stable supply of food resources. However, although a cephalopod such as a squid and an octopus is very familiar in the Japanese diet, aquaculture technology for these cephalopods has not been established.

For example, the importance of an aquaculture environment in octopus aquaculture has been pointed out, and various structures utilized by an octopus being during aquaculture have been proposed in JP 2017-006054 A, JP 10-262488 A, and Nobuhiko Akiyama (School of Marine Science and Technology, Tokai University), "Current State of High Density Storage Technology and Larval Rearing of Common Octopus," 2017 First Lecture Meeting of the Japanese Society of Fisheries Science on Fishery Stock Enhancement, Collection of Summaries, pp. 7-8, ("NPL1").

SUMMARY OF THE DISCLOSURE

Technical Problem

As considered for the various structures utilized by an octopus in JP 2017-006054 A, JP 10-262488 A, and NPL1, a maintenance and management method for an octopus is important for the commercial use of an octopus alive.

Taking aquaculture as an example, there is a problem with a cephalopod, especially a cephalopod with suction cups such as an octopus that moves freely by using the suction cups in a wall of an aquaculture tank and that easily escapes from the aquaculture tank to the outside. In addition, even when a heavy lid is provided in an aquaculture tank, a cephalopod being during aquaculture may lift the lid to create a slight gap and escape through the gap. In this manner, the escape of a cephalopod has been a problem in aquaculture, acclimatization, and the like in which a cephalopod is maintained and treated alive.

In such circumstances, an object of the present disclosure is to provide a cage and a sheet that prevent the escape of a cephalopod.

Solution to Problem

As a result of extensive research to solve the problem described above, the present inventors have found that the following disclosure is consistent with the object described above and have attained the present disclosure.

(1) A cephalopod rearing cage capable of maintaining a cephalopod alive, wherein at least a portion of the cephalopod rearing cage is constituted by using a mesh sheet of not less than 4 mesh.

(2) The cephalopod rearing cage according to (1), wherein a portion above a water surface of the cephalopod rearing cage is at least partially constituted by using the mesh sheet.

(3) The cephalopod rearing cage according to (1) or (2), wherein the mesh sheet is of not greater than 180 mesh.

(4) The cephalopod rearing cage according to any one of (1) to (3), wherein the portion above a water surface of the cephalopod rearing cage includes color repellent to a cephalopod, and/or a portion below a water surface of the cephalopod rearing cage includes color preferred by a cephalopod.

(5) The cephalopod rearing cage according to any one of (1) to (4) includes a folded portion in a top surface side of the cephalopod rearing cage.

(6) The cephalopod rearing cage according to (5), wherein a minor angle of an angle formed by a side surface portion of the cephalopod rearing cage and the folded portion is not greater than 170 degrees.

(7) The cephalopod rearing cage according to (5) or (6), wherein the folded portion includes color repellent to a cephalopod.

(8) The cephalopod rearing cage according to any one of (1) to (7), wherein a height of the side surface portion of the cephalopod rearing cage is not less than twice a total length of the cephalopod.

(9) The cephalopod rearing cage according to any one of (1) to (8), wherein the cephalopod includes a common octopus superfamily.

(10) The cephalopod rearing cage according to (9), wherein the common octopus superfamily includes a common octopus family.

(11) The cephalopod rearing cage according to (10), wherein the common octopus family includes a common octopus.

(12) The cephalopod rearing cage according to any one of (1) to (11), wherein the cephalopod includes a cephalopod being in a stage subsequent to a benthic stage.

(13) The cephalopod rearing cage according to (12), wherein an individual weight of the cephalopod is not less than 10 g.

(14) The cephalopod rearing cage according to any one of (1) to (13), wherein the cephalopod rearing cage is used for at least any one selected from the group consisting of aquaculture, acclimatization, appreciation, transportation, and storage of a cephalopod.

(15) A cephalopod escape prevention sheet capable of maintaining a cephalopod alive, wherein at least a portion of the cephalopod escape prevention sheet is constituted by using a mesh sheet of not less than 4 mesh.

(16) The cephalopod escape prevention sheet according to (15), wherein the mesh sheet is of not greater than 180 mesh.

(17) The cephalopod escape prevention sheet according to (15) or (16), wherein the cephalopod escape prevention sheet includes a portion having color repellent to a cephalopod.

(18) The cephalopod escape prevention sheet according to any one of (15) to (17), wherein a height of the cephalopod escape prevention sheet is not less than twice a total length of the cephalopod.

(19) The cephalopod escape prevention sheet according to any one of (15) to (18), wherein the cephalopod includes a common octopus superfamily.

(20) The cephalopod escape prevention sheet according to (19), wherein the common octopus superfamily includes a common octopus family.

(21) The cephalopod escape prevention sheet according to (20), wherein the common octopus family includes a common octopus.

(22) The cephalopod escape prevention sheet according to any one of (15) to (21), wherein the cephalopod includes a cephalopod being in a stage subsequent to a benthic stage.

(23) The cephalopod escape prevention sheet according to (22), wherein an individual weight of the cephalopod is not less than 10 g.

(24) The cephalopod escape prevention sheet according to any one of (15) to (23), wherein the cephalopod escape prevention sheet is used for at least any one selected from the group consisting of aquaculture, acclimatization, appreciation, transportation, and storage of the cephalopod.

(25) Use of the cephalopod rearing cage according to any one of (1) to (14) for rearing of a cephalopod.

(26) Use of the cephalopod escape prevention sheet according to any one of (15) to (24) for preventing a cephalopod from escaping.

Advantageous Effects

According to a cephalopod rearing cage or a cephalopod escape prevention sheet of the present disclosure, it is possible to suppress the escape of a cephalopod and stably maintain and manage the cephalopod alive.

DESCRIPTION OF EMBODIMENTS

The present disclosure will be described below in detail with reference to illustrative examples, but the present invention is not limited to the illustrative examples and the like described below and may be arbitrarily modified and carried out without deviating from the scope of the present disclosure. Note that herein, "from A to B" or "between A and B" are used as expressions that include the starting and ending numerical values or physical quantities.

A cephalopod rearing cage of the present disclosure is a cephalopod rearing cage capable of maintaining a cephalopod alive, and at least a portion of the cephalopod rearing cage is constituted by using a mesh sheet of not less than 4 mesh. According to the cephalopod rearing cage of the present disclosure, the escape of a cephalopod in this cage can be prevented. Note that, in the following description, the cephalopod rearing cage of the present disclosure may be described simply as the "cage of the present disclosure."

A cephalopod escape prevention sheet of the present disclosure is a cephalopod escape prevention sheet capable of maintaining a cephalopod alive, and at least a portion of the cephalopod escape prevention sheet is constituted by a mesh sheet of not less than 4 mesh. The escape of a cephalopod can be prevented by disposing the cephalopod escape prevention sheet of the present disclosure at a location where it is desired to prevent the escape of a cephalopod.

In handling a cephalopod alive, the cephalopod may utilize suction cups to escape along a wall of a tank or the like. However, the present inventors have found that when the cage of the present disclosure and the cephalopod escape prevention sheet of the present disclosure are used, due to a gap in the mesh sheet used in the above-described cage or sheet, a cephalopod cannot attach the suction cups to climb, and cannot escape. When the mesh sheet is of less than 4 mesh, a cephalopod can move by passing its tentacle through a gap in the mesh sheet even though the cephalopod cannot use the suction cups.

In the present disclosure, the "cephalopod rearing cage" is a container in which a cephalopod can be placed while maintaining and managing the cephalopod alive and is a container in which all or a portion of the container is constituted by a mesh sheet. In some embodiments, the majority of the surface of the rearing cage is constituted by mesh sheet with characteristics described herein. In some embodiments, 80% or more of the surface of the rearing cage is constituted by mesh sheet with characteristics described herein.

In the present disclosure, the "cephalopod escape prevention sheet" is a sheet used to maintain and manage a cephalopod alive, and is a sheet used to prevent the escape of a cephalopod.

The cephalopod rearing cage of the present disclosure and the cephalopod escape prevention sheet of the present disclosure are both constituted by a mesh sheet. The cephalopod escape prevention sheet can be planar, fence-shaped, or dome-shaped, and the cephalopod rearing cage can be a cage shaped container.

The cephalopod rearing cage of the present disclosure and the cephalopod escape prevention sheet of the present disclosure can be used, for example, for aquaculture, acclimatization, appreciation, transportation, and storage of a cephalopod.

Mesh Sheet

The cephalopod rearing cage of the present disclosure is a cage in which at least a portion of the cage is constituted by using a mesh sheet of not less than 4 mesh. In addition, the cephalopod escape prevention sheet of the present disclosure is constituted by using a mesh sheet of not less than 4 mesh. This "mesh sheet" is a mesh including a large number of gaps of a netting structure, a knitted structure, or the like over the entire sheet. Any mesh sheet may be used as such a mesh sheet as long as the mesh sheet has resistance to water and seawater and does not significantly change its shape or physical properties during a period of use even when the mesh sheet is immersed in water and seawater to be used. Woven fabric or a net, a cloth-like body such as lace, a porous body in which fine pores are formed over the entire surface of a sheet, or a net structure or woven structure made from various materials such as metal, and the like described below can be used.

Here, the cloth-like body refers to a body having a planar shape and constituted by using fibers themselves or by using a thread-like body made of fibers. As a structure of this cloth-like body, weave/woven fabric obtained by weaving fibers or thread, a knit fabric obtained by knitting fibers or thread, a braid obtained by braiding fibers or thread, lace obtained by forming fibers or thread into a lace shape, a net obtained by connecting thread in a mesh-like shape to form and connect stitches, cloth obtained by disposing fibers or thread in a cross-like shape and bonding intersection points of the fibers or thread, and the like can be used.

The fibers used in this cloth-like body can also have a thin thread-like shape. These fibers may be used as they are to constitute the cloth-like body, or twisted thread, or untwisted thread such as a monofilament and multifilament may be used. In addition, in addition to a round thread having a cross section substantially round, thread having any shape such as flat thread may be used. These fibers or thread may have any thickness, as long as the object of the present disclosure can be achieved, but when these fibers or thread are too thick, suction cups may be able to adhere to the fibers or thread. Thus, the thickness and the width of the fibers or thread may be not greater than 2 mm, not greater than 1 mm, not greater than 0.8 mm, not greater than 0.6 mm, or not greater than 0.4 mm at the thickest portion.

Any of organic fibers and inorganic fibers can be used for these fibers. Examples of the organic fibers include natural fibers and chemical fibers. Examples of the natural fibers include plant fibers such as cotton and hemp, and animal fibers such as wool and silk. Examples of the chemical fibers include regenerated fibers such as rayon and cupra, semi-synthetic fibers such as acetate, and various synthetic resin fibers such as polyamide, polyester, and acrylic fibers. These fibers can be used as described above as they are, or as appropriate threads. In addition, these fibers can be used alone or in a combination of not less than two.

When weave/woven fabric is used as the cloth-like body, a weave structure of the cloth-like body may be any of various weave structures such as plain weave, twill weave, and satin weave. In addition, even when the cloth-like body has another structure such as knit fabric, a braid, lace, a net, and cloth, as long as the mesh of the cloth-like body is within a predetermined range, the weave structure of the cloth-like body may be any structure.

The porous body can be also used as the mesh sheet. Examples of the porous body include a body obtained by providing a number of holes to a film, a membrane, or the like by a method such as a stretching method in which a polymer film or the like is stretched to form a structure where crystalline portions are connected by a thin stretched thread portion, a phase separation method in which a solid polymer is deposited from a liquid polymer or a solution of a polymer, and a track etching method in which damage is caused on a line by using radiation to open a hole by using chemical etching.

The net structure or woven structure made from various materials such as metal can also be used for the mesh sheet. Examples of the net structure or woven structure include a so-called wire mesh in which a linear metal is disposed in a woven fabric shape or woven in a net shape. Further, the concept also includes a structure including a gap corresponding to reticulated mesh obtained by punching metal processing.

The mesh sheet used in the present disclosure is of not less than 4 mesh. The mesh of the mesh sheet is also appropriately selected depending on the type of cephalopod. This "mesh" is the number of apertures per inch created by coaxial fibers or thread. A lower limit of the mesh may be not less than 4 mesh, not less than 5 mesh, not less than 10 mesh, not less than 18 mesh, or not less than 20 mesh. When the mesh decreases, there is a possibility that a cephalopod may move by passing the tentacle through a gap in the mesh sheet, as partially described above. As the mesh count is larger, the mesh sheet can be used for a wider range of cephalopods. In particular, the mesh is preferably not less than 10 mesh for a cephalopod of a common octopus superfamily.

The mesh sheet used in the present disclosure is preferably of not greater than 180 mesh. An upper limit of the mesh may be not greater than 165 mesh, not greater than 150 mesh, not greater than 120 mesh, not greater than 100 mesh, not greater than 70 mesh, or not greater than 50 mesh. When the mesh count is too large, a gap in the mesh sheet is small, and thus it is difficult for liquid in a tank where the cage is disposed to pass through the mesh sheet sufficiently, and the environment inside the cage easily becomes contaminated.

The material that defines the mesh, whether fibers, fiber-like portions of plastic material, thin thread-like shapes of material, and any of the material structures described above, can be described generally as constituting "strands" that define the mesh.

In some embodiments, mesh ranging between 10 and 20 is preferred, with a width of the strands forming the mesh being no wider than 0.5 mm, and preferably no wider than 0.3 mm.

In some embodiments, the width of the strands forming the mesh is no wider than 2.0 mm.

In some embodiments, the open area of the mesh, defined as the portion of an area devoid of strands, is at least 50%, and preferably at least 60%. The open area of the sheet determines the resistance to the flow of water through the sheet.

Figure 4:
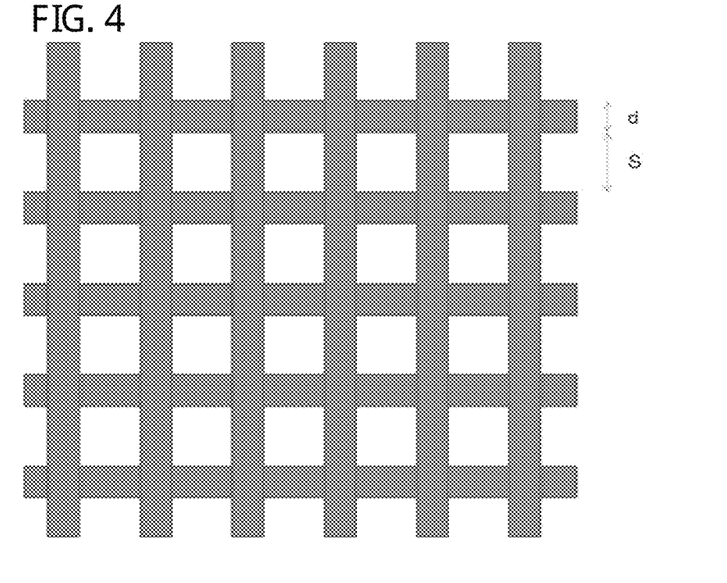
FIG. 4 is a schematic view for explaining a structure of a mesh sheet used in the present disclosure.

Thus, the strands may overlap to form square openings, such as shown in FIG. 4. In some embodiments, the spacing between the strands is not smaller than 0.15 mm by 0.15 mm.

The mesh sheet used in the present disclosure preferably includes each of axes designed within this range of the mesh. Such mesh is mesh suitable for the mesh sheet of the present disclosure in terms of the size of a gap and the thickness of thread. In addition, it is easy to obtain the mesh sheet suitable for the size and the like of the cephalopod escape prevention sheet or the cage to be used, and it is easy to dispose a structure generally including a highly uniform gap.

An aperture corresponding to the mesh will be described with respect to the mesh sheet used in the present disclosure. This aperture is the width for a square between intersecting fibers/thread in a biaxially intersecting weave structure, and when there are numerical values in both a length direction and a width direction, a numerical value of the aperture in the longer direction is the aperture. In addition, in the case of a structure such as knit fabric, a braid, lace, and a net where it is difficult to specify an aperture based on the intersection of biaxial thread (fibers), the maximum length of a gap between the thread or the like that forms the cloth-like body or the like is the aperture. In addition, in the case of the porous body, the maximum pore diameter of the pore diameters is the aperture.

The aperture of this mesh sheet may be not greater than 5 mm, not greater than 4 mm, not greater than 3 mm, not greater than 2 mm, or not greater than 1 mm. On the other hand, a lower limit of the aperture of the mesh sheet may be not less than 0.10 mm, not less than 0.15 mm, not less than 0.20 mm, not less than 0.25 mm, not less than 0.30 mm, not less than 0.35 mm, or not less than 0.40 mm.

Placement of Cephalopod Escape Prevention Sheet

The cephalopod escape prevention sheet of the present disclosure can be disposed in a planar shape in a direction to prevent the escape of a cephalopod, or can be disposed in a fence shape in an opening of a water tank containing a cephalopod, or can be disposed to cover the opening of the water tank in a dome shape. In addition, the cephalopod escape prevention sheet may be installed easily by providing a mounting member that hangs or fixes in the periphery of the mesh sheet, or a sheet, a tape, a string, or a frame having high rigidity may be provided at a side in the periphery of the mesh sheet and the shape of the cephalopod escape prevention sheet can be easily stabilized.

The mesh sheet is used in at least a portion of the cephalopod escape prevention sheet of the present disclosure. The portion in which this mesh sheet is used can be set in any range in which the escape of the cephalopod can be prevented. The portion in which this mesh sheet is used may be, for example, not less than 10%, not less than 30%, not less than 50%, not less than 70%, not less than 90%, not less than 95% of the surface area of the escape prevention sheet of the present disclosure, or this mesh sheet may be used in the entire escape prevention sheet. In addition, the shape of the portion in which this mesh sheet is used may be any shape, but may be a planar shape, a cone shape, a spherical shell shape, or a combination thereof.

In addition, the escape prevention sheet of the present disclosure may enable water to be easily exchanged through the escape prevention sheet such that a cephalopod can live. Note that portions of the escape prevention sheet of the present disclosure other than the mesh sheet used in the present disclosure may include any structure, but may include a structure from which a cephalopod cannot easily escape, or may be, for example, a mesh sheet of another mesh size that the cephalopod cannot pass through, or may be a waterproof sheet through which liquid does not pass easily.

Shape of Cage

A shape of the cage of the present disclosure is selected from any shape that serves as the cephalopod rearing cage. Examples of the shape include a cylindrical shape, a prismatic shape, a cone shape, a truncated cone shape, a spherical shape, and an elliptical shape, these shapes including diameter expanding portions or convex portions, these shapes including diameter reducing portions or concave portions, and combinations thereof. The cone shape refers to a cone-shaped three-dimensional object formed by straight lines extending radially from a single point. Examples of the cone shape include a cone and a pyramid. The truncated cone shape refers to a three-dimensional shape in which a cone that shares the same vertex and that is reduced in a similar manner is removed from a cone. Examples of the truncated cone shape include a frustum or a truncated pyramid.

The cage of the present disclosure is constituted by using the mesh sheet in at least any portion of the cage having such a shape. In the portion in which the mesh sheet is used, the movement of a cephalopod is largely limited and the cephalopod is prevented from escaping from the cage.

In the cage of the present disclosure, the portion provided with the mesh sheet used in the present disclosure can be set in any range in which the escape of a cephalopod is prevented. The portion provided with this mesh sheet may be, for example, not less than 10%, not less than 30%, not less than 50%, not less than 70%, or not less than 90% of the surface area of the cage of the present disclosure, or the mesh sheet may be used in the entire surface area of the cage. In addition, a shape of the portion provided with the mesh sheet may be any shape, and the portion may be provided in any surface of the cage, may be provided in the range of any polygonal or spherical shape of a surface of the cage, may be provided in a plurality of adjacent surfaces, or may be provided in a plurality of separated surfaces.

The cage of the present disclosure may include an opening in which a top surface or the like is open, or may have a closed shape. In the case of the closed shape, it is preferable to provide an opening that is open-and-closable for feeding and the like. The open-and-closable opening can be opened and closed as necessary by using a point fastener, a line fastener, a surface fastener, a screw-on or snap-fit lid, or the like.

Portion above Water Surface of Cage

In the present disclosure, a "portion above a water surface" of the cage is a portion that is above a water surface in using the cephalopod rearing cage. The portion above a water surface of the cage of the present disclosure is preferably at least partially constituted by using the mesh sheet. In the portion above a water surface of the cage of the present disclosure, the mesh sheet may be used as an innermost layer or the like of the cage, and it is sufficient that the mesh sheet limits the movement of a cephalopod that uses the portion above a water surface of the cage as a scaffold.

In the cage of the present disclosure, preferably, the mesh sheet of not less than 4 mesh is used over the entire circumference of at least any height of the portion above a water surface constituting the cage. Such a mesh sheet is used over the entire circumference of the portion above a water surface of the cage, and thus it difficult for a cephalopod to move from any direction of the portion above a water surface of the cage, and a possibility of the escape of the cephalopod reduces. The mesh sheet of this mesh may be provided over the entire surface of a side surface portion. In the present disclosure, the side surface portion of the cage refers to a peripheral surface with respect to the height direction, other than a bottom portion and the top surface of the cage in three-dimensional terms, when the cephalopod rearing cage is used.

A plurality of the mesh sheets layered on one another can be used in the portion above a water surface of the cage. In addition, an outer circumference of the portion above a water surface of the cage can be covered with another material such as a material for adjusting color and a material for adjusting strength.

The portion above a water surface of the cage of the present disclosure can partially include a portion which is the opening for feeding. In addition, a portion below a water surface of the cage of the present disclosure may be a structure constituted by any material, or may be constituted by using the mesh sheet similar to the mesh sheet used in the portion above a water surface.

When the cage of the present disclosure is used, the cage is disposed in a tank containing seawater or the like, and the cage is used in a state where a certain range of the cage is immersed in seawater or the like. A cephalopod is maintained mainly in the seawater in this tank as a habitat. To go out of the tank, the cephalopod moves in the portion above a water surface of the cage and goes out. For this reason, the mesh sheet for the cage of the present disclosure is used such that a cephalopod cannot move in the portion above a water surface of the cage.

The cage of the present disclosure can also be a cage having the size of mesh changed in a stepwise manner, depending on the height from a water surface. For example, the portion below a water surface of the cage may have a smaller mesh count and a portion of the portion above a water surface of the cage may have a larger mesh count, or vice versa. According to such a configuration, even when there is an individual difference in the size among a plurality of cephalopods placed in the cage, it is difficult for the cephalopods to climb the mesh sheet of either mesh.

In using the cage of the present disclosure, a portion of the portion above a water surface of the cage can be suspended at a plurality of locations as appropriate, or a core wire can be disposed in a portion corresponding to a side of the cage to adjust the shape of the cage, and the cage can be used.

Portion Below Water Surface of Cage

In the present disclosure, the "portion below a water surface" of the cage is a portion that is below a water surface in using the cephalopod rearing cage. A cephalopod lives in this cage and can be fed food from the opening of this cage. Then, cephalopod excrement and food leftovers easily settle in the portion below a water surface of the cage. When these accumulate in the cage, the environment of the cage is contaminated. Therefore, it is preferable to provide a gap of not more than 4 mesh in the bottom portion of the cage such that excrement or the like can be discharged easily from the cage.

Folded Portion of Cage

The cage of the present disclosure preferably includes a folded portion. The "folded portion" of the cage of the present disclosure is a portion that is coupled to an upper end of the side surface portion in the opening side of the cage and inclined toward the inside of the cage, and that is provided from a side of the upper end of each side surface portion, and is a portion having a diameter reduced toward a top portion of the cage. A minor angle of an angle formed by the folded portion and the side surface portion is preferably not more than 170 degrees. This angle is a value measured when the cage is set up as a cage. Preferably, the folded portion is coupled to the side surface portion to incline in an inward direction of the cage with respect to the vertical direction, and a minor angle of the angle formed by the side surface portion and the folded portion is not more than 170 degrees. This angle may be not greater than 160 degrees, not greater than 150 degrees, not greater than 140 degrees, not greater than 130 degrees, or not greater than 120 degrees. In addition, a lower limit of the angle is not limited as long as the folded portion functions, but may be not less than 60 degrees, not less than 70 degrees, not less than 80 degrees, or not less than 90 degrees from the viewpoint of ease of mounting and the like.

This folded portion may be provided as a truncated cone shape having a diameter reduced toward an upper end side of the cage, and a surface of the upper end may be an opening. In addition, the surface of the upper end of the truncated cone shape may be closed. In addition, the folded portion may be closed as a cone shape where the upper end of the cage is a vertex. A cephalopod that attempts to escape from the cage is returned back towards a bottom side of the cage by this folded portion, and thus, the escape of the cephalopod can further be prevented.

Color

The portion above a water surface of the cage of the present disclosure preferably includes a portion having color repellent to a cephalopod. The side surface portion of the cage of the present disclosure preferably includes a portion having color repellent to a cephalopod. The top surface and the folded portion corresponding to the upper side of the cage of the present disclosure preferably have color repellent to a cephalopod. For example, the portion having this color repellent to a cephalopod may be not less than 10%, not less than 30%, not less than 50%, not less than 70%, or not less than 90% of the surface area of a portion preferably having this color, or the entire portion may have this color. In particular, the side surface portion preferably includes a portion having color repellent to a cephalopod on the top surface side of the cage.

This "color repellent to a cephalopod" is color that has high metric lightness and that is classified as white or light gray in the metric lightness gradations of the Practical Color Co-ordinate System (PCCS: Japan Color Research Institute color scheme). In addition, color as hue of the color repellent to a cephalopod is preferably color having hue such as yellow and orange. In particular, the portion above a water surface of the cage of the present disclosure, the side surface portion, the top surface in the upper side of the cage, and the folded portion are preferably white with high metric lightness. As described above, when a cephalopod escapes from the cage, the cephalopod moves in the side surface portion and escapes from the opening in the top surface. When this direction to escape is set to be light color, the cephalopod avoids that direction, and thus, it becomes difficult for the cephalopod to escape. Thus, the portion above a water surface of the cage, the side surface portion, the top surface of the upper side of the cage, and the folded portion are preferably light color.

In particular, the portion above a water surface of the cage cannot be avoided when a cephalopod attempts to escape from the cage. Therefore, the configuration where this portion includes the color repellent to a cephalopod is effective in preventing the escape of a cephalopod. Whether or not color is the color repellent to a cephalopod can be determined by observing that a cephalopod spends a shorter time on that color when the cephalopod is exposed to the living environment under the same conditions.

The cephalopod escape prevention sheet of the present disclosure preferably includes a portion having color repellent to a cephalopod, and is more preferably white with high metric lightness. The cephalopod escape prevention sheet of the present disclosure has such a color, and thus a cephalopod avoids the direction in which the escape prevention sheet is disposed, and it becomes difficult for the cephalopod to escape.

This color repellent to a cephalopod can be white, or color having a pale, light, bright, or light grayish tone. Among these tones, orange, yellow, or yellow green can also be used as hue. In particular, white with high metric lightness can also be used.

The portion below a water surface, or lower side of the cage of the present disclosure preferably includes a portion having color preferred by a cephalopod. The bottom portion of the cage of the present disclosure preferably includes a portion having color preferred by a cephalopod. For example, the portion having color preferred by cephalopods may be not less than 10%, not less than 30%, not less than 50%, not less than 70%, or not less than 90% of the surface area of a portion that preferably has this color, or the entire portion may be this color.

The "color preferred by a cephalopod" described above is color that has low metric lightness and that is classified as dark gray or black in the metric lightness gradations of the PCCS. As hue of the color preferred by a cephalopod, hue such as blue, and bluish purple is preferably used. A cephalopod, especially an octopus, is thought to avoid light color and conversely, tends to move to a dark color side. In maintaining a cephalopod by using the cage of the present disclosure, the cephalopod prefers being in the bottom portion side, and thus, a risk of the escape of the cephalopod reduces. Thus, the portion below a water surface of the cage, including the lower side and/or the bottom portion preferably have dark color. This dark color is preferably black, or color having a dark grayish or dark tone, and among these tones, blue, purple, or red can also be used as hue. In addition, black can also be used. Whether or not color is the color preferred by a cephalopod can be determined by observing that a cephalopod spends a longer time on that color when the cephalopod is exposed to the rearing environment under the same conditions. According to the configuration where the portion below a water surface has the color preferred by a cephalopod, a cephalopod spends a longer time under the water surface, and thus, the escape of the cephalopod from the cage can be prevented.

The above-described color of the portion above a water surface of the cage, the portion below a water surface, the side surface portion, the top surface, the bottom portion and the like of the present disclosure may be color of the mesh sheet used for each of the portions. In addition, the above-described color of the cephalopod escape prevention sheet of the present disclosure may be color of the mesh sheet used for the escape prevention sheet. Alternatively, a configuration where the periphery of the mesh sheet is covered with another material can be adopted, and color of each of the portions such as light color or dark color as a whole can also be set according to color of the material covering the periphery of the mesh sheet.

The height of the side surface portion of the cage of the present disclosure is preferably not less than twice the total length of a cephalopod placed in the cephalopod rearing cage. In addition, the height of the cephalopod escape prevention sheet of the present disclosure is preferably not less than twice the total length of a cephalopod placed in the cephalopod rearing cage.

Figure 1:
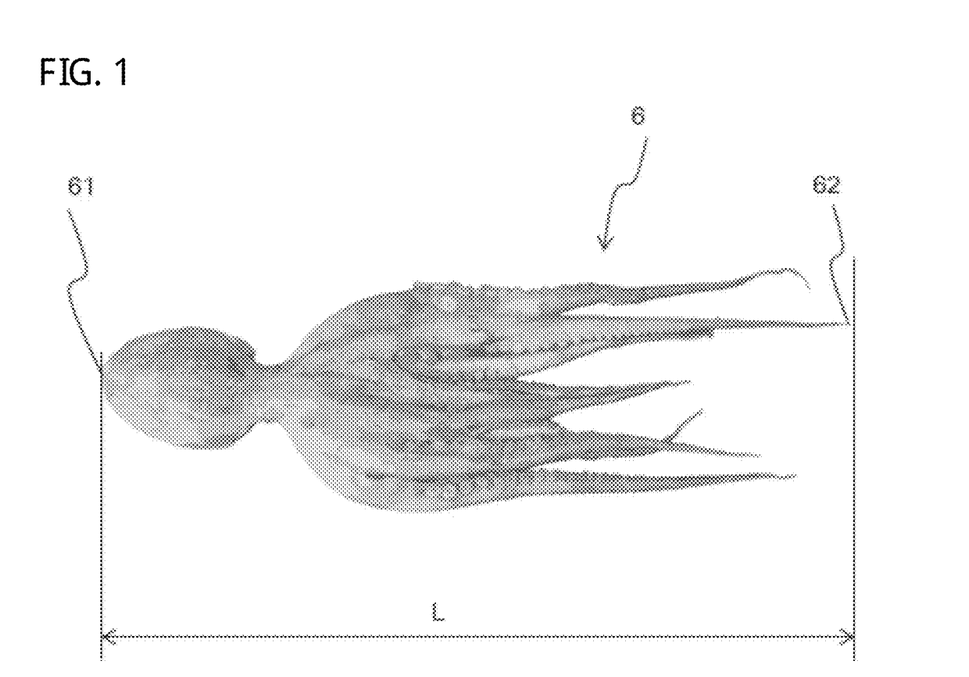
FIG. 1 is a view of an octopus for explaining an example of measuring the total length of a cephalopod.

In the present disclosure, the "total length" of a cephalopod is a linear distance from a mantle tip to a tip of the longest tentacle of the cephalopod. The total length of a cephalopod will be explained by using an octopus as an example with reference to FIG. 1. The total length of an octopus 6 is a linear distance L from a mantle tip 61 to a tip 62 of the longest tentacle. A cephalopod can grab a portion that serves as a scaffold within the range where a tentacle reaches, and the cephalopod moves the entire body. To prevent the escape from the cage, the height of the side surface portion of the cage is set in advance to be not less than twice the total length of a cephalopod, and thus, the escape of the cephalopod can be prevented.

A lower limit of this height can be not less than 2.5 times, not less than 3 times, not less than 4 times, or not less than 5 times. An upper limit of the height is not particularly defined, but can be not more than 100 times the total length of a cephalopod. The upper limit of this height can be not more than 90 times, not more than 80 times, not more than 70 times, not more than 60 times, or not more than 50 times.

In using the cage of the present disclosure, the cage may be disposed in a tank. Since a cephalopod prefers a hiding place, an octopus jar, a cylinder or a prism including an opening and a cavity portion, a structure provided with a plurality of compartments formed by partition plates, and the like may further be disposed in the cage for use.

Cephalopod

A "cephalopod" as a target of the present disclosure belongs to the category Mollusca Cephalopoda. The present disclosure is applicable to a general cephalopod that is a target for aquaculture and rearing of these cephalopods. Specific examples of the cephalopod include *Doryteuthis* (spear squid), *Sepioteuthis lessoniana* (oval squid), *Sepia* (cuttlefish), Octopus vulgaris (common octopus), Octopus ocellatus (ocellated octopus), Enteroctopus dofleini (giant Pacific octopus), and Octopus maya (Mexixan four-eyed octopus).

The cephalopod as a target of the present disclosure preferably includes a common octopus superfamily, more preferably a common octopus family, and particularly preferably a common octopus. The common octopus is an aquatic organism which is particularly eaten in Japan and the like, and for which the establishment of complete aquaculture technology is desired. Aquaculture using the cage of the present disclosure is very suitable for the complete aquaculture of the common octopus.

An aquaculture stage of the cephalopod as a target of the present disclosure can be any life stage of the cephalopod. As for the aquaculture stage, the cage of the present disclosure is preferably used for the aquaculture of the cephalopod being in a stage subsequent to a benthic stage. Further, the cage of the present disclosure is preferably used for the aquaculture of the cephalopod being in a stage subsequent to a bottom dwelling stage. As the size of the cephalopod as a target of the present disclosure, the individual weight of the cephalopod can be not less than 10 g, and the cage of the present disclosure can be used for the cephalopod that has the individual weight of not less than 20 g, not less than 30 g, not less than 50 g, not less than 70 g, not less than 100 g, not less than 200 g, not less than 250 g, not less than 300 g, not less than 500 g, not less than 1 kg, not less than 1.5 kg, not less than 2 kg, not less than 2.5 kg, or not less than 3 kg.

The cage of the present disclosure and the cephalopod escape prevention sheet of the present disclosure can be used for at least any one selected from the group consisting of aquaculture, acclimatization, appreciation, transportation, and storage of a cephalopod. The cage of the present disclosure and the cephalopod escape prevention sheet of the present disclosure can be used for rearing a cephalopod and for preventing the escape of the cephalopod. In addition, the cage of the present disclosure and the cephalopod escape prevention sheet of the present disclosure can be used as a method of rearing by using the cage of the present disclosure or a method of preventing the escape of a cephalopod by using the cephalopod escape prevention sheet of the present disclosure. In particular, the cage of the present disclosure and the cephalopod escape prevention sheet of the present disclosure can be used mainly for use during aquaculture. A size of the cage of the present disclosure and of the cephalopod escape prevention sheet of the present disclosure can be designed according to each application. The specific size can be designed in accordance with a size of a water tank or a container used for its application in the related art.

In rearing of a common octopus by using the cage of the present disclosure, a common octopus is territorial, and thus, often shows aggressiveness toward other individuals. However, even when a plurality of common octopuses are reared in the cage of the present disclosure, there is surprisingly almost no self-injury nor injury to others.

First Embodiment

Figure 2:
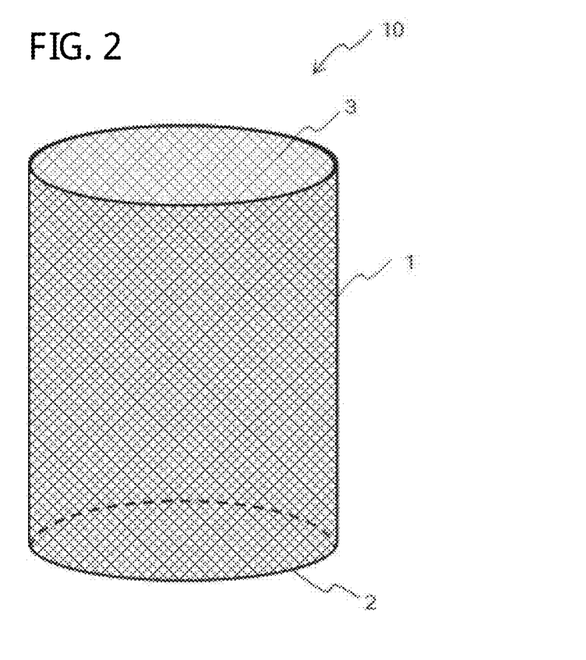
FIG. 2 is a schematic view of a cage according to a first embodiment of the present disclosure.

FIG. 2 illustrates a schematic perspective view of a first embodiment of a cage according to the present disclosure. FIG. 2 illustrates a cage 10 having a cylindrical shape. The cage 10 is constituted by using mesh woven fabric of a mesh sheet including a side surface 1 of not less than 4 mesh, and a top surface is an opening 3 in which a hole is opened. A bottom portion 2 is formed of mesh woven fabric coarser than the side surface portion 1 and includes a gap of less than 4 mesh. A cephalopod can be maintained alive inside the cage 10.

Second Embodiment

Figure 3:
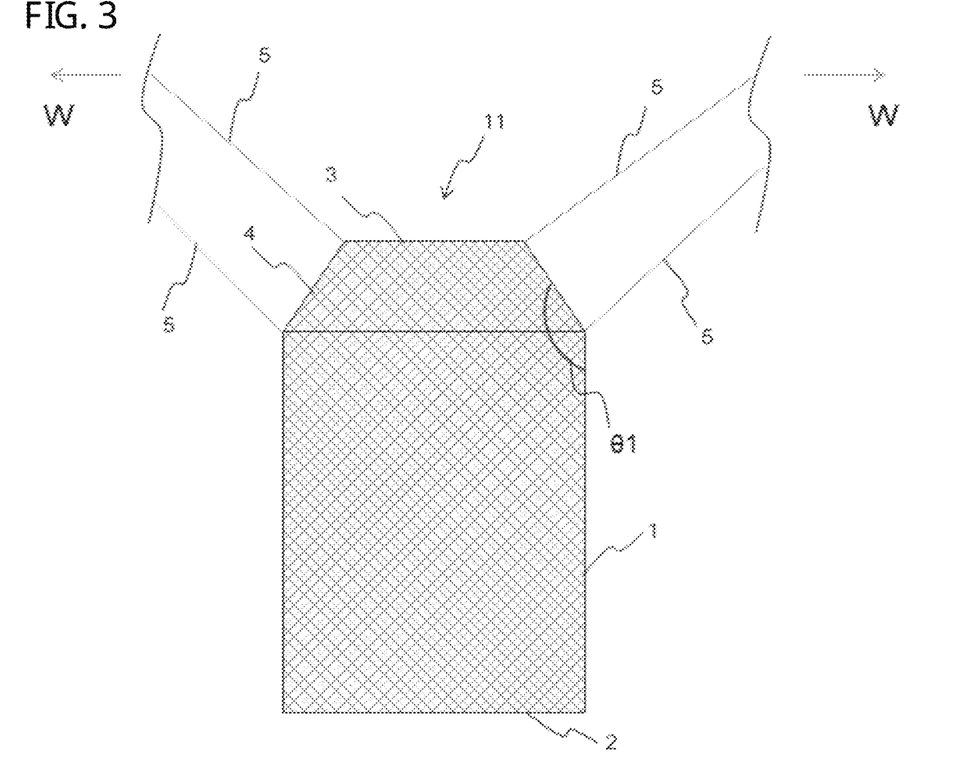
FIG. 3 is a schematic view of a cage according to a second embodiment of the present disclosure.

FIG. 3 illustrates a schematic side view of a second embodiment of a cage according to the present disclosure. FIG. 3 illustrates a cage 11 provided with a folded portion 4 in a top surface side of a side surface portion 1 including a structure of a quadrangular prism. The side surface portion 1 and the folded portion 4 in the top surface side are constituted by using woven fabric having the same mesh. In the cage 11, an upper end side of the folded portion 4 is not closed, and a top surface is an opening 3 in which a hole is opened, such that the introduction of food and the like can be performed easily. A bottom portion 2 includes a gap of less than 4 mesh, in a similar manner to the first embodiment. In this second embodiment, the cage is suspended by fixing each of an upper end of the side surface portion 1 and an upper end of the folded portion 4 with a suspension cord 5 to a wall or a tank wall of an aquaculture tank provided in an extension direction of each suspension cord (direction of an arrow W in FIG. 3). At this time, a degree of folding of the folded portion can be designed by a minor angle θ1 of an angle formed by the side surface portion 1 and the folded portion 4, on the basis of the shape of the cage during use. A cephalopod can be maintained alive inside the cage 11.

FIG. 4 is a view illustrating an example of the mesh sheet that can be used in the side surface portion or the like of the cage of the present disclosure. This mesh sheet is cloth in which warp thread and weft thread are disposed in a direction orthogonal to each other, and portions where the thread intersects are bonded and fixed to each other by fusion. In this cloth, a distance "S" between the thread can also be used as a size of a gap (aperture). In addition, the thread is thread having a width "d" measured along the surface of the sheet. The thread is a form of strand describe above.

EXAMPLES

The present disclosure will be described below in further detail with reference to examples, but the present invention is not limited to the examples described below.

A cage (A) was produced according to the structure described below in accordance with the second embodiment illustrated in FIG. 3.

Side surface portion: A cage was formed by using 50-mesh polyethylene woven fabric (white), and included a side surface portion of a quadrangular prism shape having a width of 65 cm and a height of 70 cm.

Bottom portion: Polyethylene woven fabric made of tricalnet was used to provide a bottom surface having a quadrangular prism shape.

Folded portion: The folded portion was provided by using the same woven fabric as the side surface portion. The folded portion had a length of 20 cm, and was designed such that the minor angle (θ1 in FIG. 3) of an angle formed by the side surface portion and the folded portion was 160 degrees when the cage was suspended and in a set up state.

Test Method

Test fish: Total of 7 common octopuses weighing 500 g to 2 kg.

Example 1 (Cage)

300 L of seawater was kept in a test section where the cage (A) described above was installed in a 500 L water tank, and 3 common octopuses were stored, and it was confirmed whether there was an escape. During the test, the water flow was set to 5 to 6 L/m in and whether or not there was an escape was observed after 1 hour, 2 hours, and 24 hours.

Comparative Example 1 (Water Tank)

In accordance with Example 1, 4 common octopuses were stored in a water tank keeping seawater without using the cage (A), and it was confirmed whether or not there was an escape.

Test Results

Among the common octopuses in the test section according to the Comparative Example 1, two octopuses escaped from the water tank in 0 to 1 hour after the storing, and one octopus escaped from the water tank in 1 to 2 hours after the storing. Further, after 24 hours, the remaining one octopus also escaped and the test was ended.

On the other hand, in the test section of Example 1, no escaped octopus was observed even after 24 hours.

[FIG. 1]

| | NUMBER OF TEST FISHES | ESCAPE RATE AFTER 1 HOUR | ESCAPE RATE AFTER 2 HOURS | ESCAPE RATE AFTER 24 HOURS |
|---|---|---|---|---|
| COMPARATIVE EXAMPLE 1 (WATER TANK) | 4 | 50% | 75% | 100% |
| EXAMPLE 1 (CAGE) | 3 | 0% | 0% | 0% |

INDUSTRIAL APPLICABILITY

A cephalopod rearing cage of the present disclosure and a cephalopod escape prevention sheet of the present disclosure are used for maintaining a cephalopod alive, and are suitable for, for example, aquaculture, acclimatization, appreciation, transportation, and storage of a cephalopod. The cephalopod rearing cage of the present disclosure and the cephalopod escape prevention sheet of the present disclosure make it easy to maintain and manage a cephalopod alive and are industrially useful.

REFERENCE SIGNS LIST

1 Side surface portion
10, 11 Cage
2 Bottom portion
3 Opening
4 Folded portion
5 Suspension cord
6 Octopus
61 Mantle tip
62 Tentacle tip

We claim:

1. A cephalopod rearing cage capable of maintaining a cephalopod alive, wherein at least a portion of the cephalopod rearing cage is constituted by using a mesh sheet of not less than 4 mesh, and
wherein a top surface of the cage is open.

2. The cephalopod rearing cage according to claim 1, wherein an upper portion of the cephalopod rearing cage is at least partially constituted by using the mesh sheet.

3. The cephalopod rearing cage according to claim 2, wherein the mesh sheet is of not greater than 180 mesh.

4. The cephalopod rearing cage according to claim 3, wherein the upper portion of the cephalopod rearing cage has a color that has high metric lightness and that is classified as white or light gray in the metric lightness gradations of the Practical Color Coordinate System (PCCS: Japan Color Research Institute color scheme), and a lower portion of the cephalopod rearing cage has a color that has low metric lightness and that is classified as dark gray or black in the metric lightness gradations of the PCCS.

5. The cephalopod rearing cage according to claim 1, comprising:
 a folded portion in a top surface side of the cephalopod rearing cage.

6. The cephalopod rearing cage according to claim 5, wherein a minor angle of an angle formed by a side surface portion of the cephalopod rearing cage and the folded portion is not greater than 170 degrees.

7. The cephalopod rearing cage according to claim 5, wherein the folded portion has a color that has high metric lightness and that is classified as white or light gray in the metric lightness gradations of the PCCS.

8. The cephalopod rearing cage according to claim 7, wherein a height of the side surface portion of the cephalopod rearing cage is not less than twice a total length of the cephalopod.

9. The cephalopod rearing cage according to claim 1, wherein the cephalopod is from a common octopus superfamily.

10. The cephalopod rearing cage according to claim 9, wherein the common octopus superfamily is a common octopus family.

11. The cephalopod rearing cage according to claim 10, wherein the common octopus family is a common octopus.

12. The cephalopod rearing cage according to claim 1, wherein the cephalopod is a cephalopod being in a stage subsequent to a benthic stage.

13. The cephalopod rearing cage according to claim 12, wherein an individual weight of the cephalopod is not less than 10 g.

14. The cephalopod rearing cage according to claim 1, wherein the cephalopod rearing cage is adapted for use in at least any one selected from the group consisting of aquaculture, acclimatization, appreciation, transportation, and storage of a cephalopod.

15. Use of the cephalopod rearing cage according to claim 1 for rearing of a cephalopod.

16. The cephalopod rearing cage according to claim 1, comprising a side surface and a bottom surface, the side surface and the bottom surface comprising the mesh sheet, wherein the mesh of the mesh sheet is between 10 and 20 mesh and comprises strands having a width no greater than 0.5 mm.

17. The cephalopod rearing cage according to claim 16, wherein a majority of the side surface is comprised by the mesh sheet.

18. The cephalopod rearing cage according to claim 16, comprising an upper portion and a lower portion, wherein the upper portion comprises a color that has high metric lightness and that is classified as white or light gray in the metric lightness gradations of the PCCS and the lower portion comprises a color that has low metric lightness and that is classified as dark gray or black in the metric lightness gradations of the PCCS, and wherein in use of the cephalopod rearing cage the lower portion is positioned in water and at least a portion of the upper portion is positioned above the water.

19. The cephalopod rearing cage according to claim 1, comprising a side surface and a bottom surface, a majority of the side surface and the bottom surface comprising the mesh sheet, wherein the mesh sheet has an open area greater than 50%.

20. The cephalopod rearing cage according to claim 1, wherein the mesh sheet is formed by strands defining apertures therewithin, and wherein the apertures are at least 0.15 mm by 0.15 mm in size.

21. The cephalopod rearing cage according to claim 1, comprising a side surface and a bottom surface, the side surface comprising the mesh sheet and including a folded portion, wherein the mesh sheet comprises between 40 and 60 mesh and is made of polyethylene fabric with quadrangular prism shaped apertures.

22. A cephalopod escape prevention sheet capable of maintaining a cephalopod alive, wherein
 at least a portion of the cephalopod escape prevention sheet is constituted by using a mesh sheet of not less than 4 mesh,
 a first portion of the cephalopod escape prevention sheet has a color that has high metric lightness and that is classified as white or light gray in the metric lightness gradations of the Practical Color Coordinate System (PCCS: Japan Color Research Institute color scheme), and
 a second portion of the cephalopod escape prevention sheet has a color that has low metric lightness and that is classified as dark gray or black in the metric lightness gradations of the PCCS.

23. The cephalopod escape prevention sheet according to claim 22, wherein the mesh sheet is of not greater than 180 mesh.

24. The cephalopod escape prevention sheet according to claim 22, wherein a height of the cephalopod escape prevention sheet is not less than twice a total length of the cephalopod.

25. The cephalopod escape prevention sheet according to claim 22, wherein the cephalopod is from a common octopus superfamily.

26. The cephalopod escape prevention sheet according to claim 25, wherein the common octopus superfamily is a common octopus family.

27. The cephalopod escape prevention sheet according to claim 26, wherein the common octopus family is a common octopus.

28. The cephalopod escape prevention sheet according to claim 22, wherein the cephalopod is a cephalopod being in a stage subsequent to a benthic stage.

29. The cephalopod escape prevention sheet according to claim 28, wherein an individual weight of the cephalopod is not less than 10 g.

30. The cephalopod escape prevention sheet according to claim 22, wherein the cephalopod escape prevention sheet is adapted for use in at least any one selected from the group consisting of aquaculture, acclimatization, appreciation, transportation, and storage of a cephalopod.

31. Use of the cephalopod escape prevention sheet according to claim 22 for preventing a cephalopod from escaping.

\* \* \* \* \*